H. H. ELWOOD.
COMBINED HOOD AND SEAT FOR AUTOMOBILES.
APPLICATION FILED MAY 22, 1912.
1,047,016.
Patented Dec. 10, 1912.
2 SHEETS—SHEET 2.
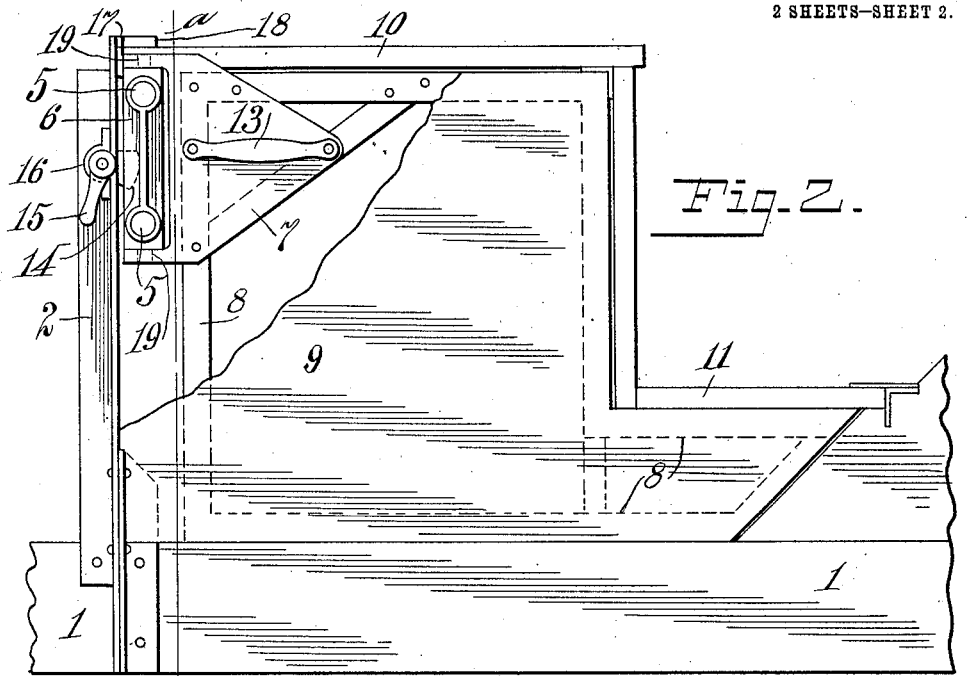
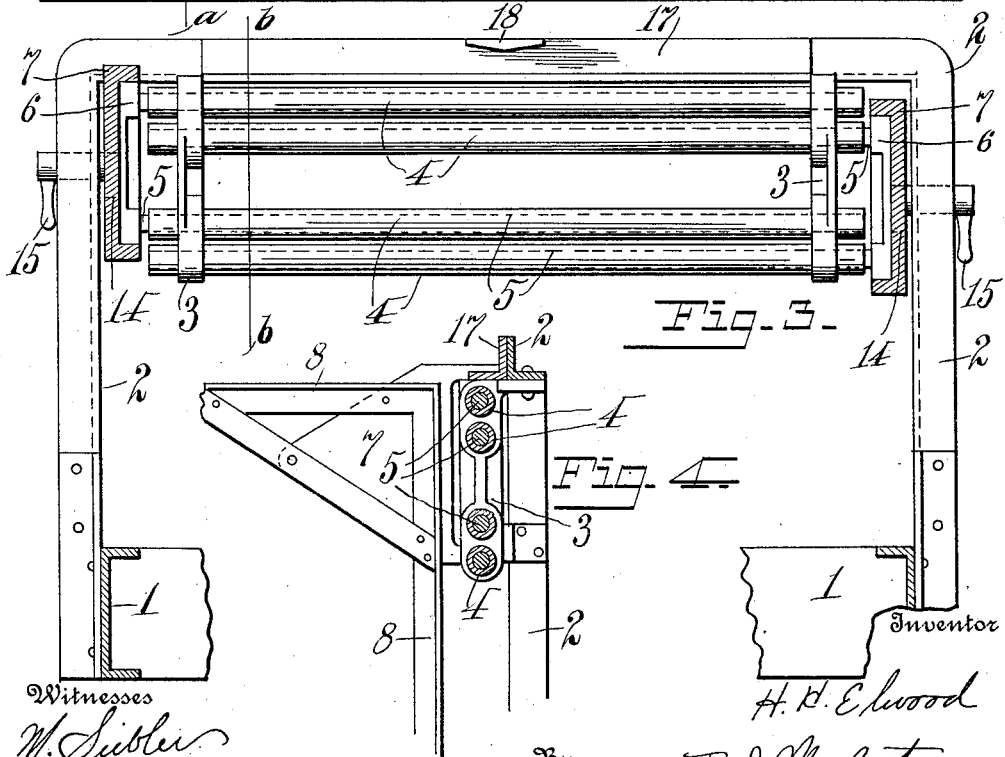

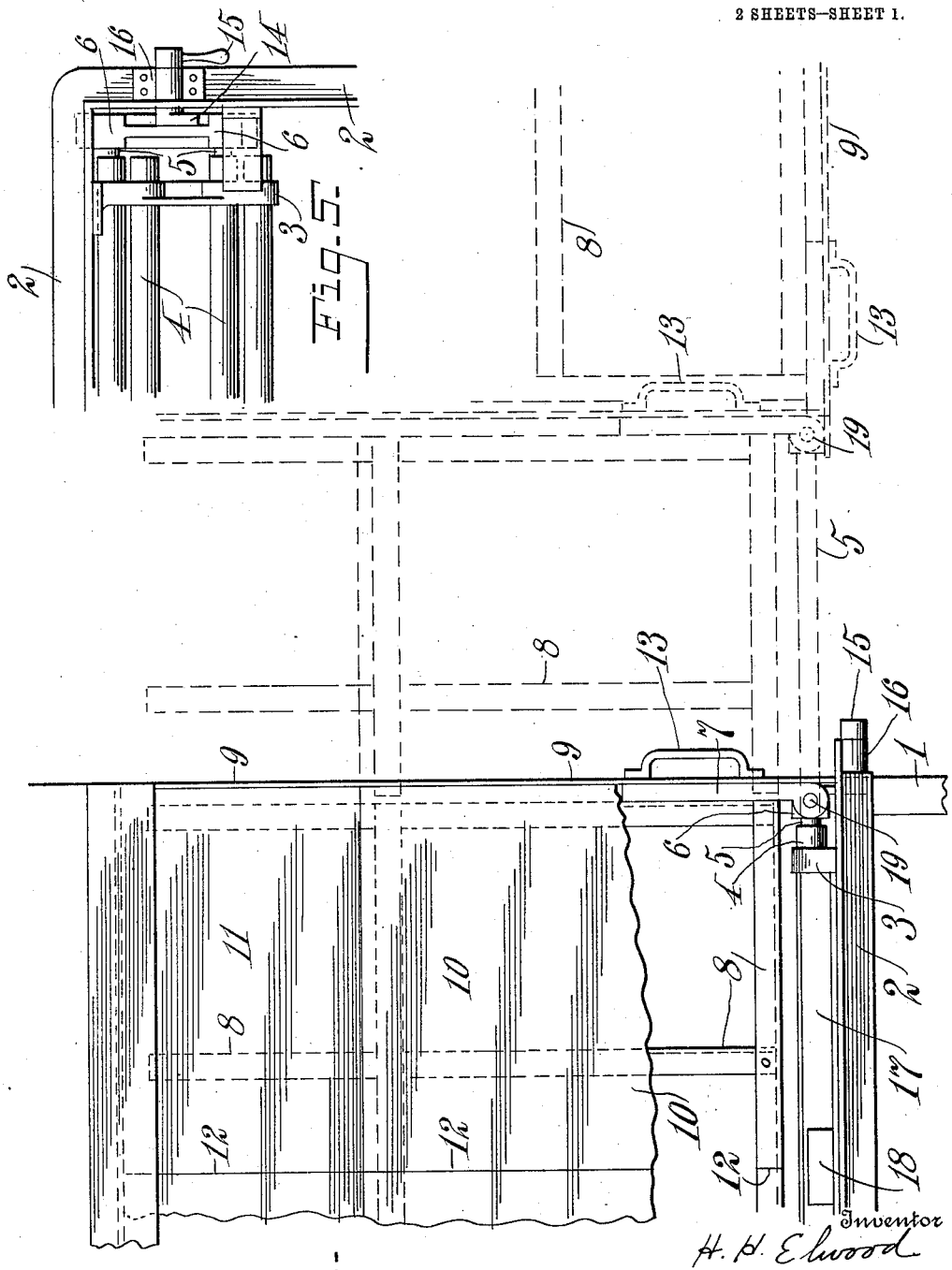

UNITED STATES PATENT OFFICE.

HARRY H. ELWOOD, OF MIDDLETOWN, OHIO.

COMBINED HOOD AND SEAT FOR AUTOMOBILES.

1,047,016.  Specification of Letters Patent.  Patented Dec. 10, 1912.

Application filed May 22, 1912. Serial No. 698,923.

*To all whom it may concern:*

Be it known that I, HARRY H. ELWOOD, citizen of the United States, residing at Middletown, in the county of Butler and State of Ohio, have invented certain new and useful Improvements in Combined Hoods and Seats for Automobiles; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in a combined hood and seat for automobiles.

The object of the invention is to provide a device of this type which may be easily shifted and swung to one side to permit access to be had to the driving mechanism of the automobile.

Another object of the invention is to provide a device of this type which economizes space thereby permitting the wheel base to be made of minimum length.

Referring to the accompanying drawings, Figure 1 is a top plan view of one side of the combined seat and hood, both sides being duplicates, and showing, by means of broken lines, the seat extended and swung to one side to permit access to be had to the driving mechanism; Fig. 2 is a side elevation of the same; Fig. 3 is a section on the line *a—a* of Fig. 2 with the casing and seat supporting frame removed; Fig. 4 is a section on the line *b—b* of Fig. 3; and Fig. 5 is a rear view of one corner of the supporting frame.

Throughout the specification and drawings, similar reference characters indicate corresponding parts.

Referring more particularly to the drawings, 1 represents the sides of the main frame of the automobile to which the ends of a frame 2 are attached. Attached to and depending from the frame 2 are brackets 3 which receive guide tubes 4. Adapted to slide in the tubes 4 are rods 5 the ends of which are attached to heads 6. There is a head 6 on each side of the automobile and each head 6 is provided with two rods 5. Pivotally attached to the heads 6, by means of pivots 19, are hinged members 7 to which frames 8 are attached. The frames 8 inclose the driving mechanism of the automobile such as the engine or storage battery (not shown). The sides of the frames 8 are inclosed by side plates 9 while the upper portions are inclosed by the seat 10 and foot boards 11.

In the drawings, I have only shown the base board of the seat, but it will be understood that the seat may be provided with any form of upholstering that may be desired.

The frames 8 and the seat 10 and foot board 11 carried thereby, extend half way across the machine, and the inner edges thereof about along the center line 12, as shown in Fig. 1. The frames 8 are provided with handles 13, and when it is desired to obtain access to the driving mechanism under the seat, the frames, and the seat and foot board 11 carried thereby, are moved laterally to the intermediate position shown in dotted lines in Fig. 1. When in this position, the frames 8 and parts carried thereby may be swung in the pivots 19, thereby placing said parts to one side which permits unobstructed access to be had to the driving mechanism. When the frames 8 are extended, they are supported by the rods 5 which lie in the tubes 4 and which extend entirely across the machine. The frames 8 may therefore be moved laterally to a maximum extent, to place them out of obstructing positions. The frames 8 are locked in their normal position, by a cam 14 adapted to engage ribs on the heads 6. The cams 14 are mounted in bearings 16 attached to the frame 2 and are provided with handles 15 by means of which they may be manipulated. When the seat portions 11 are in a normal position, the rear edges thereof are supported by an angle bar 17 attached to the frame 2, while the inner corners are held firmly in position by a projection 18 provided with inclined faces which engage the seat portions.

It will be seen that by thus constructing the hood and seat of an automobile, the seat can be removed, to expose for adjustment the motors or batteries or other driving appliances, as easily as if the appliances were covered by a hood only. This device, therefore, economizes space and permits the wheel base to be made shorter without diminishing the carrying capacity, thereby allowing the automobile to operate in narrow streets and alleys and in crowded places.

Having described my invention, I claim:

1. In a device of the type specified, a motor vehicle frame, a lateral horizontal guide mounted on said frame, a laterally movable sub-frame supported by said guide, and a seat portion pivoted to the outer end of said sub-frame and adapted to inclose the driving mechanism of the vehicle.

2. In a device of the type specified, a motor vehicle frame, lateral horizontal guides mounted on said frame, laterally movable sub-frames supported by said guides, side frames pivoted to said sub-frames and adapted to inclose the sides of the driving mechanism of the vehicle, and seat portions mounted on said side frames and adapted to inclose the top of the driving mechanism.

3. In a device of the type specified, a motor vehicle frame, two lateral horizontal guides mounted on said frame, a laterally movable sub-frame supported by each of said guides, a side frame mounted on each side of the vehicle frame and each of which is pivoted to one of said sub-frames, and abutting seat portions mounted on said side frames.

In testimony whereof I affix my signature, in presence of two witnesses.

HARRY H. ELWOOD.

Witnesses:
GILBERT S. GUNDERSEN,
MATTHEW SIEBLER.

---

Copies of this patent may be obtained for five cents each, by addressing the "Commissioner of Patents, Washington, D. C."